US 12,506,376 B2

(12) United States Patent
Kuehbacher et al.

(10) Patent No.: US 12,506,376 B2
(45) Date of Patent: Dec. 23, 2025

(54) STATOR OF AN ELECTRIC MACHINE

(71) Applicant: Robert Bosch GmbH, Stuttgart (DE)

(72) Inventors: Daniel Kuehbacher, Stuttgart (DE); Thomas Heid, Lauf (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 18/291,019

(22) PCT Filed: Jun. 8, 2022

(86) PCT No.: PCT/EP2022/065456
§ 371 (c)(1),
(2) Date: Jan. 22, 2024

(87) PCT Pub. No.: WO2023/001447
PCT Pub. Date: Jan. 26, 2023

(65) Prior Publication Data
US 2024/0258857 A1  Aug. 1, 2024

(30) Foreign Application Priority Data
Jul. 23, 2021  (DE) ...................... 10 2021 207 920.2

(51) Int. Cl.
*H02K 3/24* (2006.01)
*H02K 1/16* (2006.01)
(Continued)

(52) U.S. Cl.
CPC ............... *H02K 3/24* (2013.01); *H02K 1/16* (2013.01); *H02K 3/345* (2013.01); *H02K 3/50* (2013.01)

(58) Field of Classification Search
CPC ........... H02K 1/16; H02K 3/24; H02K 3/345; H02K 3/50
(Continued)

(56) References Cited

U.S. PATENT DOCUMENTS 3,119,033 A  1/1964  Horsley et al.
4,994,700 A  2/1991  Bansal et al.
(Continued)

FOREIGN PATENT DOCUMENTS

CN    102420468 B   11/2017
DE  102019113785 A1  11/2020
(Continued)

OTHER PUBLICATIONS

Translation of International Search Report for Application No. PCT/EP2022/065456 dated Oct. 14, 2022 (2 pages).
(Continued)

*Primary Examiner* — Rashad H Johnson
(74) *Attorney, Agent, or Firm* — Michael Best & Friedrich LLP

(57) ABSTRACT

The invention relates to a stator (1) of an electric machine (23), comprising a laminated core (3) on which stator teeth (4) and stator grooves (5) lying between the stator teeth (4) are formed and which comprises a plurality of laminations (6), wherein a single conductor (9) or a conductor bundle (10) comprising a plurality of conductors (9) is provided in each stator groove (5) in order to form an electric stator winding (8), wherein support points (11) which are mutually spaced in the axial direction are formed in the stator grooves (5) in order to support the conductor (9) or conductor bundle (10) lying in the respective stator groove (5), and at least one groove gap (14) is formed between the walls (4.2,5.1) of the respective stator groove (5) and the conductor or conductor bundle (9,10) arranged in the stator groove (5), said groove gap forming a groove gap channel (15) which extends in the axial direction and through which a coolant can flow, wherein the support points (11) are formed by support devices (12), each of which comprises one or more support discs (13) of the laminated core (3),
(Continued)

wherein
the support devices (12) have at least one fluid channel (18) running outside of the stator groove (5) for at least one of the stator grooves (5), in particular all of the stator grooves, said fluid channel forming an inlet (18.1) or outlet (18.2) into or out of the respective groove gap channel (15) of the respective stator groove (5) and/or a bypass (18.3) for bypassing one of the support points (11) of the respective stator groove (5).

17 Claims, 3 Drawing Sheets

(51) Int. Cl.
  *H02K 3/34* (2006.01)
  *H02K 3/50* (2006.01)
(58) Field of Classification Search
  USPC .......................................................... 310/59
  See application file for complete search history.

(56) References Cited

U.S. PATENT DOCUMENTS

| | | |
|---|---|---|
| 2011/0133580 A1 | 6/2011 | Sugimoto et al. |
| 2012/0074708 A1 | 3/2012 | Le Besnerais |
| 2018/0351434 A1 | 12/2018 | Knoblauch et al. |
| 2019/0363601 A1 | 11/2019 | Kneidl et al. |
| 2020/0156296 A1 | 5/2020 | E Silva et al. |
| 2020/0373803 A1 | 11/2020 | Stoll et al. |
| 2022/0014062 A1 | 1/2022 | Almeida E Silva et al. |
| 2022/0311297 A1 | 9/2022 | Hinrich et al. |
| 2023/0013487 A1* | 1/2023 | Grimm .................. H02K 1/146 |
| 2024/0213839 A1* | 6/2024 | Vogt ....................... H02K 1/165 |
| 2024/0258857 A1* | 8/2024 | Kuehbacher ............. H02K 3/50 |
| 2024/0258858 A1* | 8/2024 | Kuehbacher ............. H02K 9/19 |
| 2025/0088048 A1* | 3/2025 | Kronsteiner ............. H02K 3/24 |
| 2025/0167603 A1* | 5/2025 | Kuehbacher ............. H02K 3/24 |

FOREIGN PATENT DOCUMENTS

| | | |
|---|---|---|
| EP | 2693608 A1 | 2/2014 |
| FR | 3093388 A1 | 9/2020 |
| JP | S52124039 U | 9/1977 |
| JP | S5449520 U | 4/1979 |
| JP | S55133640 A | 10/1980 |
| JP | S58127833 U | 8/1983 |
| JP | 2001145302 A | 5/2001 |
| JP | 2012100433 A | 5/2012 |
| JP | 2014197962 A | 10/2014 |
| JP | 2015033226 A | 2/2015 |
| JP | 2018164374 A | 10/2018 |
| JP | 2020089261 A | 6/2020 |
| JP | 2020524469 A | 8/2020 |

OTHER PUBLICATIONS

Non-final Office Action issued by the U.S. Patent Office for U.S. Appl. No. 18/291,007 dated Sep. 30, 2025 (16 pages).
Non-final Office Action issued by the U.S. Patent Office for U.S. Appl. No. 18/291,025 dated Sep. 25, 2025 (15 pages).

* cited by examiner

STATOR OF AN ELECTRIC MACHINE

BACKGROUND

The invention proceeds from a stator of an electric machine.

A stator of an electric machine is already known from DE102019113785 A1, comprising a stator axis and a laminated core on which stator teeth and stator grooves lying between the stator teeth are formed and which comprises a plurality of laminations, wherein the stator teeth are interconnected via an annular stator yoke, wherein a conductor bundle comprising a plurality of conductors and formed by a stack of flat wire conductors is provided in each stator groove, in order to form an electric stator winding, wherein a plurality of support points which are mutually spaced in the axial direction with respect to the stator axis are formed in each stator groove, in order to clamp the conductor or conductor bundle lying in the respective stator groove, wherein at least one groove gap is formed between the walls of the respective stator groove and the conductor or conductor bundle arranged in the stator groove, said groove gap forming a groove gap channel which extends in the axial direction, through which a coolant can flow. The support points of each stator groove are each formed on a special lamella of the laminated core, referred to as a clamping stator lamination, in that a clamping contour comprising a plurality of clamping projections is provided in each case. The special lamellas differ from the other laminations of the laminated core. The conductor bundles must each be inserted into the stator grooves in the axial direction with respect to the stator axis and moved through the clamping contours under the effect of clamping forces.

The inlet or outlet into the respective groove gap channel is formed between the clamping projections of the respective clamping contour. However, the flow area of the inlet or outlet into the respective groove gap channel is narrowed by the clamping projections, which cause increased flow resistance or increased pressure loss when flowing through the groove gap channel.

SUMMARY

The electric machine stator according to the invention has the advantage that the pressure loss or flow resistance in the respective groove gap channel is reduced in that the support devices have at least one fluid channel running outside the stator groove for at least one of the stator grooves, in particular all of the stator grooves, said fluid channel forming an inlet or outlet into or out of the respective groove gap channel of the respective stator groove and/or a bypass for bypassing one of the support points of the respective stator groove. The disadvantageous flow-hydraulic effect with regard to pressure loss and flow resistance at the support points 11 is thus at least reduced or completely avoided.

The respective fluid channel of the respective stator groove can advantageously be formed in one of the stator teeth or in the stator yoke of the laminated core.

It is particularly advantageous if the respective fluid channel of the respective stator groove runs outside of a plurality of support discs which have aligned or overlapping channel recesses, in order to form the fluid channel. In particular, the plurality of support discs may be support discs with different channel recesses. Furthermore, the respective channel recess of the respective support disc can be designed to be continuous in the axial direction, i.e., as a through-opening. This makes it particularly easy to form the fluid channel in the support discs in terms of manufacturing, for example by punching.

It is further advantageous if a further bypass running through the laminated core branches off from the respective fluid channel of the respective stator groove to partially bypass the respective groove gap channel. This allows other areas of the stator to be cooled in addition to the stator grooves or conductors or conductor bundles.

It is very advantageous if the respective support disc of the respective support device is formed from a different material than the laminations, in particular from a non-magnetic or poorly electrically conductive material. This reduces the additional losses due to eddy currents accordingly. Alternatively, the respective support disc 13 can be made of the same material as the laminations 6.

It is also advantageous if the respective support disc of the respective support device has a disc thickness that is formed to be larger than a sheet thickness of the laminations of the laminated core. This simplifies the handling of the support discs and requires fewer parts to be manufactured and assembled. Alternatively, the respective support disc 13 can have a disc thickness corresponding to the thickness of the laminations 6.

Furthermore, it is advantageous if the support points of the respective support device are formed by rotating at least two support discs of the support device by a certain angle of twist $\phi$ around the stator axis. In this way, the conductor or conductor bundle of the respective stator groove is clamped between two tooth flanks at the respective support point. Alternatively, the support points can be formed by retaining elements of the respective support device, which are designed as separate or one-piece elements, for example.

It is advantageous if, by twisting the support discs in opposite directions to form the respective support point, support sections of the support discs are formed which project into the stator groove from opposite sides of the respective stator groove in order to hold, in particular to clamp, the conductor or conductor bundle between the support sections on retaining surfaces of the conductor or conductor bundle. Each support point is thus formed by at least two support sections which project into the stator groove from opposite sides of the respective stator groove and clamp the conductor or conductor bundle. In this way, the conductor or the conductor bundle can be supported centrally or centrically in the respective stator groove in the circumferential direction with respect to the stator axis.

It is also advantageous if a protective layer is provided between the conductor or conductor bundle of the respective stator groove and the respective support device, which is formed in particular in the form of a cuff, sleeve-shaped tubular, clamp-shaped, U-shaped, strip-shaped, or flat strip-shaped. In this way, the conductors or conductor bundles are protected from mechanical damage, for example, caused by clamping between the protruding support sections of the support discs. For example, punched edges or burrs on the support sections of the support discs could damage paint insulation on the conductors. In particular, the electrically non-conductive protective layer can be used to achieve so-called groove insulation. The time-consuming insertion of a separate groove insulation, for example an insulation paper, in the stator grooves can thus be omitted.

The invention further relates to an electric machine having a housing in which a stator according to the invention is arranged, wherein the stator winding forms a winding head on each end face of the stator, wherein a winding head cooling chamber, which accommodates the respective winding head, is provided inside the housing on each end face of the stator for cooling the respective winding head, wherein the stator grooves, starting from one of the two winding head cooling chambers, can be flowed through at least intermittently into the other winding head cooling chamber, in particular via the fluid channels of the support devices according to the invention. In this way, particularly good cooling of the stator can be achieved.

BRIEF DESCRIPTION OF THE DRAWING

An exemplary embodiment of the invention is shown in simplified form in the drawings and explained in further detail in the following description.

DETAILED DESCRIPTION

Figure 1:
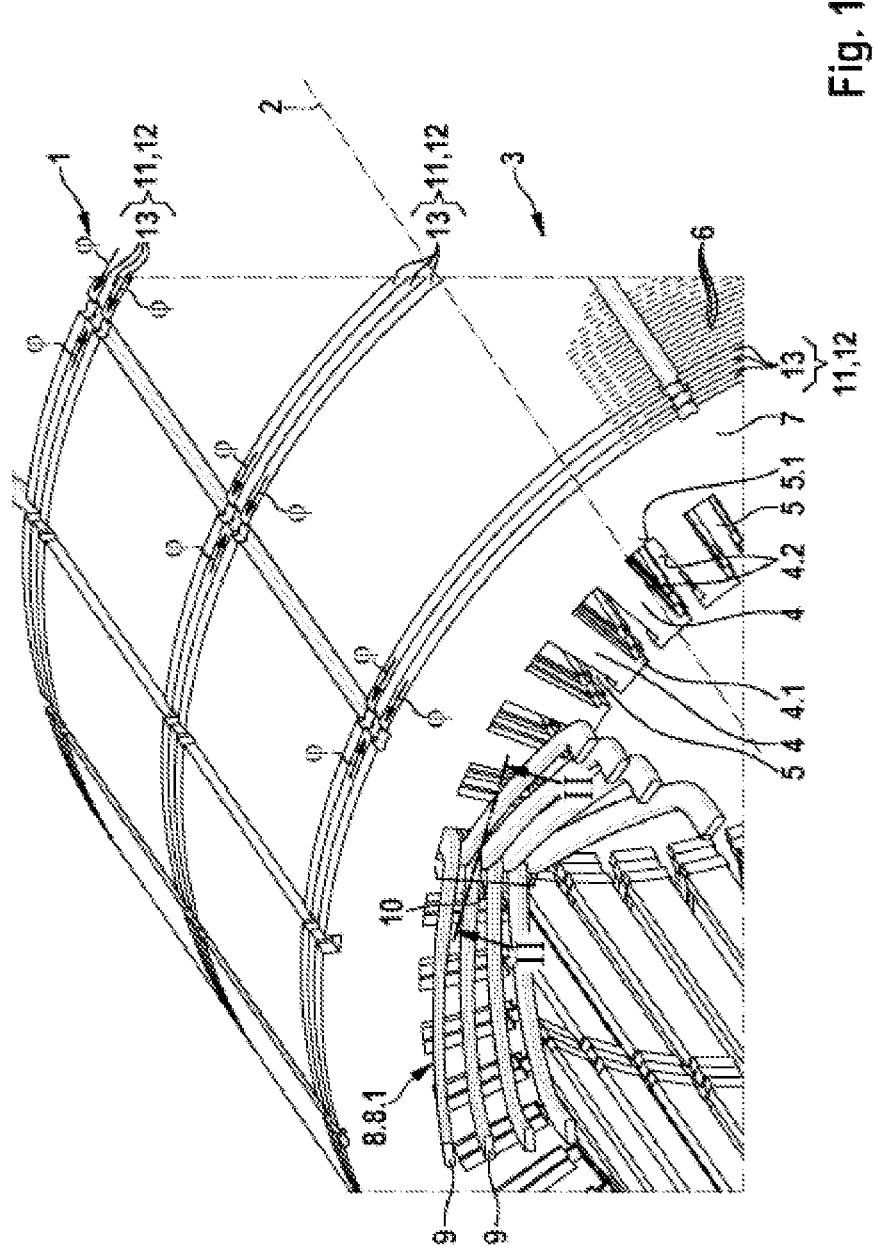
FIG. 1 shows a partial view of a stator of an electric machine according to the invention, FIG. 2 a view of the stator according to FIG. 1 along a line of intersection II-II with a conductor or conductor bundle mounted in one of the stator grooves at several support points, according to the invention, FIG. 3 an electric machine with the stator according to the invention as shown in FIG. 1 and FIG. 2.

FIG. 1 shows a partial view of a stator of an electric machine according to the invention.

The stator 1 of an electric machine has a stator axis 2 and comprises a laminated core 3 on which stator teeth 4 and stator grooves 5 lying between the stator teeth 4 are formed and which is formed by laminations 6.

The stator teeth 4 are interconnected via an annular stator yoke 7 of the laminated core 3 and may have a tooth head 4.1. Either a single conductor 9 or a conductor bundle 10 comprising a plurality of conductors 9 may be provided in each of the stator grooves 5 in order to form an electric stator winding 8. To illustrate the invention, FIG. 1 shows a conductor bundle 10 in only one of the stator grooves 5.

The conductors 9 of the stator 1 can each be formed as a flat wire conductor, each of which has a square, in particular rectangular, conductor cross-section. Furthermore, the conductors 9 of the stator 1 can each be formed as hairpin or as I-pin conductor elements. For example, the conductors 9 are coated with an insulating varnish in a known manner.

Figure 2:
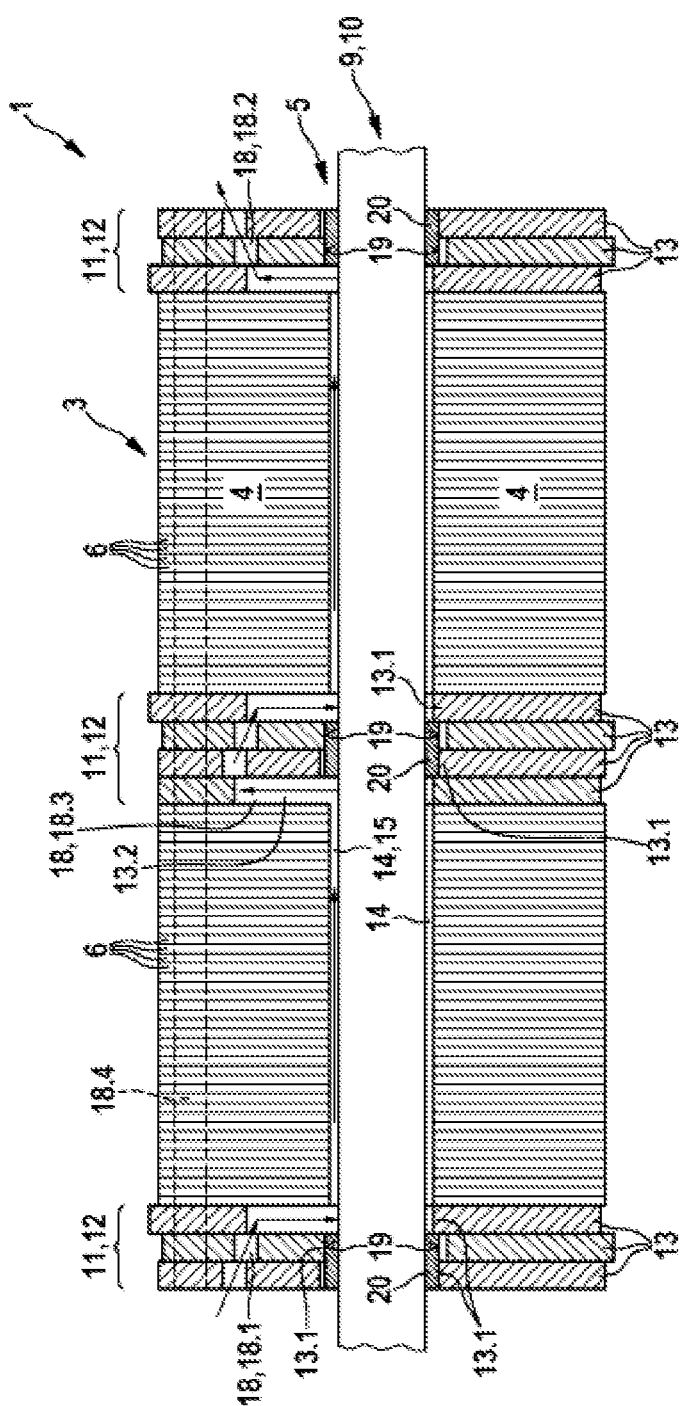

FIG. 2 shows a sectional view of the stator according to FIG. 1 with a conductor or conductor bundle mounted in one of the stator grooves at a plurality of support points according to the invention.

At least two, for example three, support points 11 mutually spaced in the axial direction with respect to the stator axis 2 are formed in each of the stator groves 5, in order to hold, clamp, restrain, or support the conductor 9 or conductor bundle 10 lying in the respective stator groove 5. Between the support points 11, the conductor 9 or the conductor bundle 10 of the respective stator groove 5 are freely suspended, i.e., without contact with the laminated core 3. The conductor 9 or the conductor bundle 10 of the respective stator groove 5 is thus in contact with the laminated core 6 only at the support points 11.

Between the walls of each stator groove 5 and the conductor or conductor bundle 9,10 arranged in the stator groove 5, there is at least one groove gap 14, which forms a groove gap channel 15 extending in the axial direction through which a coolant, in particular oil, can flow. As a result, the coolant can flow through the respective stator groove 5 in the axial direction continuously or intermittently.

For example, the conductor 9 or the conductor bundle 10 is mounted centrally in the respective stator groove 5 in such a way that three groove gaps 14 are formed in the stator groove 5 outside the support points 11, namely two groove gaps 14 on the tooth flanks 4.2 of the respective stator groove 5 and one groove gap 14 on a groove bottom 5.1. As a result, the cross-section of the groove gap channel 15 in the respective stator groove 5 is U-shaped.

The support points 11 of the respective stator groove 5 are formed by support devices 12, each comprising one or a plurality of support discs 13. Like the laminations 6, the support discs 13 are part of the laminated core 3 and have recesses, in order to form the stator grooves 5 like the laminations 6.

The support devices 12 are provided, for example, at the two end faces of the laminated core 3 and, for example, additionally within the laminated core 3 between the two end faces of the laminated core 3.

The respective support disc 13 of the respective support device 12 can be formed from the same material as the laminations 6 or from a different material, for example an non-magnetic or poorly electrically conductive material. Furthermore, the respective support disc 13 of the respective support device 12 can have a disc thickness d2 which corresponds to the thickness d1 of the laminations 6 or which is formed to be greater than the thickness d1 of the laminations 6 of the laminated core 3. The support discs 13 can, therefore, also be formed by one or a plurality of laminations 6.

The groove gap channels 15 are narrowed, interrupted, or closed at the support points 11, which is disadvantageous for the flow through the groove gap channels 15 or the stator grooves 5.

According to the invention, it is therefore provided that the support devices 12 have at least one fluid channel 18 running outside of the stator groove 5 for at least one of the stator grooves 5, in particular all of the stator grooves, said fluid channel forming an inlet 18.1 or outlet 18.2 into or out of the respective groove gap channel 15 of the respective stator groove 5 and/or a bypass 18.3 for bypassing one of the support points 11 of the respective stator groove 5. In this manner, the pressure loss or flow resistance in the respective groove gap channel 15 is reduced so that the coolant can flow through the groove gap channels 15 with the lowest possible pressure loss or flow resistance. The disadvantageous hydraulic effect at the support points 11 with regard to pressure loss and flow resistance is thus at least reduced or completely avoided.

The respective fluid channel 18 of the respective stator groove 5 can be formed in one of the stator teeth 4 or in the stator yoke 7 of the laminated core 3. The respective fluid channel 18 of the respective stator groove 5 can, for example, run over a plurality of support discs 13, which have aligned or overlapping channel recesses 13.2 to form the fluid channel 18, each of which is designed as a through-opening, for example. In particular, the plurality of support discs 13 can be support discs having different channel recesses to allow the fluid channels 18 to open into the stator groove 5.

The bypass 18.3 for bypassing one of the support points 11 is formed, for example, within the laminated core 3 and serves to connect two sections of the same grooved gap channel 15. According to the exemplary embodiment in FIG. 2, the bypass 18.3 is formed downstream of the inlet 18.1 and upstream of the outlet 18.2 of the respective stator groove 5 or the respective groove gap channel 15.

A further bypass 18.4 running through the laminated core 3 can also branch off from the respective fluid channel 18 of the respective stator groove 5 to partially bypass the respective groove gap channel 15, whereby a partial flow of the coolant is directed via the respective groove gap channel 15 of the respective stator groove 5 and a remaining partial flow is directed via the further bypass 18.4.

According to the exemplary embodiment, the support points 11 of the respective support device 12 are formed, for example, by rotating at least two support discs 13 of the support device 12 by a certain angle of twist φ around the stator axis 2 or alternatively by retaining elements of the respective support device 12.

By twisting the support discs 12 in opposite directions to form the respective support point 11, support sections 13.1 of the support discs 13 are formed which project into the stator groove 5 from opposite sides of the respective stator groove 5 in order to hold, in particular in order to clamp, the conductor 9 or conductor bundle 10 between the support sections 13.1 on retaining surfaces 19 of the conductor 9 or conductor bundle 10. The twisted support discs 12 are fixed in the laminated core 3 to prevent further twisting, for example by material-locking joining, in particular by welding.

A protective layer 20 can be provided between the conductor 9 or conductor bundle 10 of the respective stator groove 5 and the respective support device 12, which is formed in particular in the form of a cuff, sleeve-shaped tubular, clamp-shaped, U-shaped, strip-shaped, or flat strip-shaped and is provided at least on the retaining surfaces 19.

Figure 3:
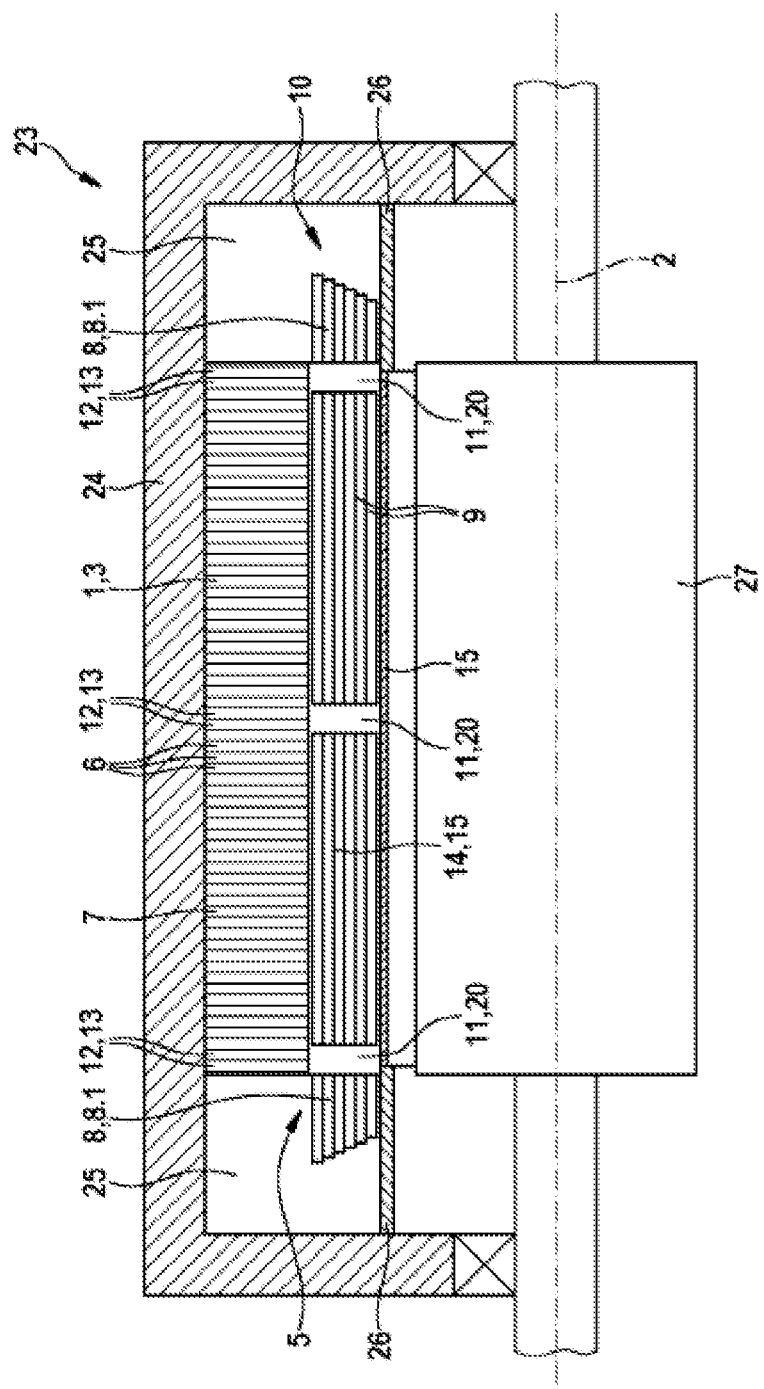

FIG. 3 shows an electric machine with the stator according to the invention as shown in FIG. 1 and FIG. 2.

The electric machine 23 has a housing 24 in which a stator 1 according to the invention is arranged. The stator winding 8 forms a winding head 8.1 at each end face of the stator 1. Within the housing 24, a winding head cooling chamber 25 accommodating the respective winding head 8.1 is provided at each end face of the stator 1 for cooling the respective winding head 8.1. In this case, the stator grooves 5 of the stator 1 can be flowed through starting from one of the two winding head cooling chambers 25 into the other winding head cooling chamber 25, for example in parallel, in series or with a combination of parallel and in series, in particular via the fluid channels 18 of the respective support devices 12.

The respective winding head cooling chamber 25 is bounded radially inwards with respect to the stator axis 2 by an annular wall 26, for example a sealing sleeve. The sealing sleeve 26 may, for example, extend into an air gap formed between the stator 1 and a rotor 27 of the electric machine 23 in order to form a so-called slotted tube, and project through the gap in the axial direction with respect to the stator axis 2.

The invention claimed is:

1. A stator (1) of an electric machine (23), comprising a stator axis (2) and a laminated core (3) on which stator teeth (4) and stator grooves (5) lying between the stator teeth (4) are formed and which comprises a plurality of laminations (6), wherein the stator teeth (4) are interconnected via an annular stator yoke (7), wherein a single conductor (9) or a conductor bundle (10) comprising a plurality of conductors (9) is provided in each stator groove (5), in order to form an electric stator winding (8), wherein a plurality of support points (11) which are mutually spaced in an axial direction with respect to the stator axis (2) are formed in each stator groove (5), in order to support the conductor (9) or conductor bundle (10) lying in the respective stator groove (5), wherein at least one groove gap (5) is formed between walls (4.2,5.1) of the respective stator groove (5) and the conductor or conductor bundle (9,10) arranged in the stator groove (5), said groove gap (14) forming a groove gap channel (15) which extends in the axial direction and through which a coolant can flow, wherein the support points (11) are formed by support devices (12) which each comprise one or a plurality of support discs (13) of the laminated core (3), wherein the support devices (12) have at least one fluid channel (18) running outside of the stator groove (5) for at least one of the stator grooves (5), said fluid channel forming an inlet (18.1) or outlet (18.2) into or out of the respective groove gap channel (15) of the respective stator groove (5) and/or a bypass (18.3) for bypassing one of the support points (11) of the respective stator groove (5).

2. The stator according to claim 1, wherein the respective fluid channel (18) of the respective stator groove (5) is formed in one of the stator teeth (4) or in the stator yoke (7) of the laminated core (3).

3. The stator according to claim 1, wherein the respective fluid channel (18) of the respective stator groove (5) runs outside of a plurality of support discs (12) which have aligned or overlapping channel recesses (13.2) to form the fluid channel (18).

4. The stator according to claim 3, wherein the overlapping channel recesses (13.2) are each formed as a through opening.

5. The stator according to claim 1, wherein a further bypass (18.4) running outside of the laminated core (3) branches off from the respective fluid channel (18) of the respective stator groove (5) for partially bypassing the respective groove gap channel (15).

6. The stator according to claim 1, wherein the respective support disc (13) of the respective support device (12) is formed from a different material than the laminations (6).

7. The stator according to claim 6, wherein the respective support disc (13) of the respective support device (12) is formed from a non-magnetic or poorly electrically conductive material.

8. The stator according to claim 1, wherein the respective support disc (13) of the respective support device (12) has a disc thickness (d2) which is larger than a thickness (d1) of the laminations (6) of the laminated core (3).

9. The stator according to claim 1, wherein the support points (11) of the respective support device (12) are formed by twisting at least two support discs (13) of the support device (12) by a selected angle of twist (φ) around the stator axis (2) or through retaining elements of the respective support device (12).

10. The stator according to claim 9, wherein by twisting the support discs (13) to form the respective support point (11), support sections (13.1) of the support discs (13) are formed which project into the stator groove (5) from opposite sides of the respective stator groove (5) in order to hold the conductor (9) or the conductor bundle (10) between the support sections (13.1) on retaining surfaces (19) of the conductor (9) or conductor bundle (10).

11. The stator according to claim 10, wherein the protective layer (20) is formed in a shape of a cuff, is sleeve-shaped, is tubular, is clamp-shaped, is U-shaped, is strip-shaped, or is flat strip-shaped.

12. The stator according to claim 1, wherein a protective layer (20) is provided between the conductor (9) or conductor bundle (10) of the respective stator groove (5) and the respective support device (12).

13. An electric machine (23) having a housing (24) in which a stator (1) according to claim 1 is arranged, wherein the stator winding (8) forms a winding head (8.1) on each end face of the stator (1), wherein a winding head cooling chamber (25), which accommodates the respective winding head (8.1), is provided inside the housing (24) on each end face of the stator (1) for cooling the respective winding head (8.1), wherein the stator grooves (5), starting from one of the two winding head cooling chambers (25), can be flowed through at least in sections into the other winding head cooling chamber (25).

14. The electric machine (23) according to claim 13, wherein the stator grooves (5), starting from one of the two winding head cooling chambers (25), can be flowed through at least in sections into the other winding head cooling chamber (25) via the fluid channels (18) of the support devices (12).

15. The stator according to claim 1, wherein the conductor bundle (10) includes a stack of flat wire conductors.

16. The stator according to claim 1, wherein the coolant is oil.

17. The stator according to claim 1, wherein the support devices (12) have at least one fluid channel (18) running outside of the stator groove (5) for all of the stator grooves.

* * * * *